(12) United States Patent
Kollep

(10) Patent No.: US 7,213,505 B2
(45) Date of Patent: May 8, 2007

(54) COFFEE MACHINE FOR A CAR

(75) Inventor: Alexandre Kollep, Lutry (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/758,181

(22) Filed: Jan. 14, 2004

(65) Prior Publication Data

US 2004/0149139 A1   Aug. 5, 2004

Related U.S. Application Data

(63) Continuation of application No. PCT/EP02/05387, filed on May 16, 2002.

(30) Foreign Application Priority Data

Jul. 20, 2001   (EP) .................................. 01117588

(51) Int. Cl.
*A47J 31/00* (2006.01)

(52) U.S. Cl. ............................ 99/281; 99/290; 99/295; 99/302 R

(58) Field of Classification Search ................. 99/295, 99/302 R, 303, 290, 283, 289 R, 281; 219/281, 219/202, 214, 387, 437, 472, 521
See application file for complete search history.

(56) References Cited

U.S. PATENT DOCUMENTS

| | | | | |
|---|---|---|---|---|
| 3,955,713 A | * | 5/1976 | Hurley | .................... 222/129.4 |
| 4,495,404 A | * | 1/1985 | Carmichael | ................. 392/447 |
| 5,440,972 A | * | 8/1995 | English | ........................ 99/282 |
| 5,551,331 A | * | 9/1996 | Pfeifer et al. | ................. 99/280 |
| 5,619,902 A | * | 4/1997 | Schotte | ......................... 99/281 |
| 5,836,169 A | * | 11/1998 | Marlette | ...................... 62/331 |
| 5,921,168 A | * | 7/1999 | Nello | ........................... 99/295 |
| 5,992,298 A | | 11/1999 | Illy et al. | ....................... 99/281 |
| 6,062,127 A | | 5/2000 | Klosinsku et al. | ............ 99/303 |
| 6,098,525 A | | 8/2000 | Gijzel et al. | .................. 99/282 |
| 6,584,888 B2 | * | 7/2003 | Cortese | .................... 99/289 R |
| 6,807,898 B2 | * | 10/2004 | De Koning et al. | ...... 99/289 R |

FOREIGN PATENT DOCUMENTS

| | | |
|---|---|---|
| EP | 0 496 940 A1 | 8/1992 |
| FR | 1564088 | 4/1969 |
| WO | WO 95/25457 | 9/1995 |
| WO | WO 95/34236 | 12/1995 |

\* cited by examiner

*Primary Examiner*—Reginald L. Alexander
(74) *Attorney, Agent, or Firm*—Bell, Boyd & Lloyd LLP

(57) ABSTRACT

The present invention relates to an espresso coffee machine designed for a low-voltage vehicle that includes a water tank connected to a pump for pumping the water to a heating element which is itself connected to a brewing head in which a cartridge of coffee is brewed, a moveable closure for closing the head with a mechanism for moving the closure from an open position to a closed position and vice versa, a coffee dispensing pipe associated with the closure and a connection for the electric power supply, in which machine the heating of the heating element is switched off or reduced when the pump is running.

14 Claims, 4 Drawing Sheets

COFFEE MACHINE FOR A CAR

CROSS-REFERENCE TO RELATED APPLICATIONS

This application is a continuation of International application PCT/EP02/05387 filed May 16, 2002, the entire content of which is expressly incorporated herein by reference thereto.

BACKGROUND ART

The present invention relates to an espresso coffee machine designed for a low-voltage vehicle, such as a car, a boat, a caravan or other fixed or mobile cabin.

The prior art already includes espresso coffee machines that can be used in cars. U.S. Pat. No. 6,062,127 relates to an espresso coffee machine that can be used in a car. The problem with this type of device is that the coffee is obtained in the receptacle by virtue of the fact that the water begins to boil and the coffee is brewed by the steam. This has at least two consequences: in the first place it produces overheated coffee because the temperature of the brewing water is between 100 and 120° C., and secondly, in order to add water to the tank the whole machine must be opened and then closed, necessitating very inconvenient handling on the part of the consumer. Thus, there is a need for improvements in these type devices, and one is provided by the present invention.

SUMMARY OF THE INVENTION

The present invention now provides the consumer, in a low-voltage cabin, an espresso coffee machine that does not have the disadvantages of the prior art. The coffee machine according to the invention requires less handling and prepares good coffee of uniform quality over time.

Accordingly, the present invention relates to an espresso coffee machine for a low-voltage vehicle. This machine comprises a water tank, a pump, a heating element, and a brewing head wherein the water tank is fluidly connected to a pump for pumping water from the tank to a heating element which is itself fluidly connected to a brewing head in which a cartridge of coffee is brewed. The machine also includes a moveable closure for closing the head comprising a mechanism for moving the closure from an open position to a closed position and vice versa and a coffee dispensing pipe associated with the closure to provide an outlet for brewed coffee. In addition, a connection for engaging an electric power supply is provided, along with a controller that switches off or reduces operation of the heating element when the pump is running.

The heating element is configured and dimensioned to retain an amount of water therein which is sufficient to dispense a single espresso beverage. In this way, the water used to brew the espresso can be heated to a uniform temperature prior to being introduced into the brewing head so that more uniform beverages are made. Also, the devices saves power in that the heating element only needs to be operated on demand when an espresso beverage is to be dispensed.

Various methods of operation of the machine form additional embodiments of the invention. One convenient feature is that the machine is configured and dimensioned to be filled, operated and emptied by one hand so as to not distract the driver while the espresso is being made.

BRIEF DESCRIPTION OF THE DRAWINGS

The features and advantages of the invention are more clearly understood in connection with the following detailed description and drawings, in which.

DETAILED DESCRIPTION OF THE PREFERRED EMBODIMENTS

Figure 1:
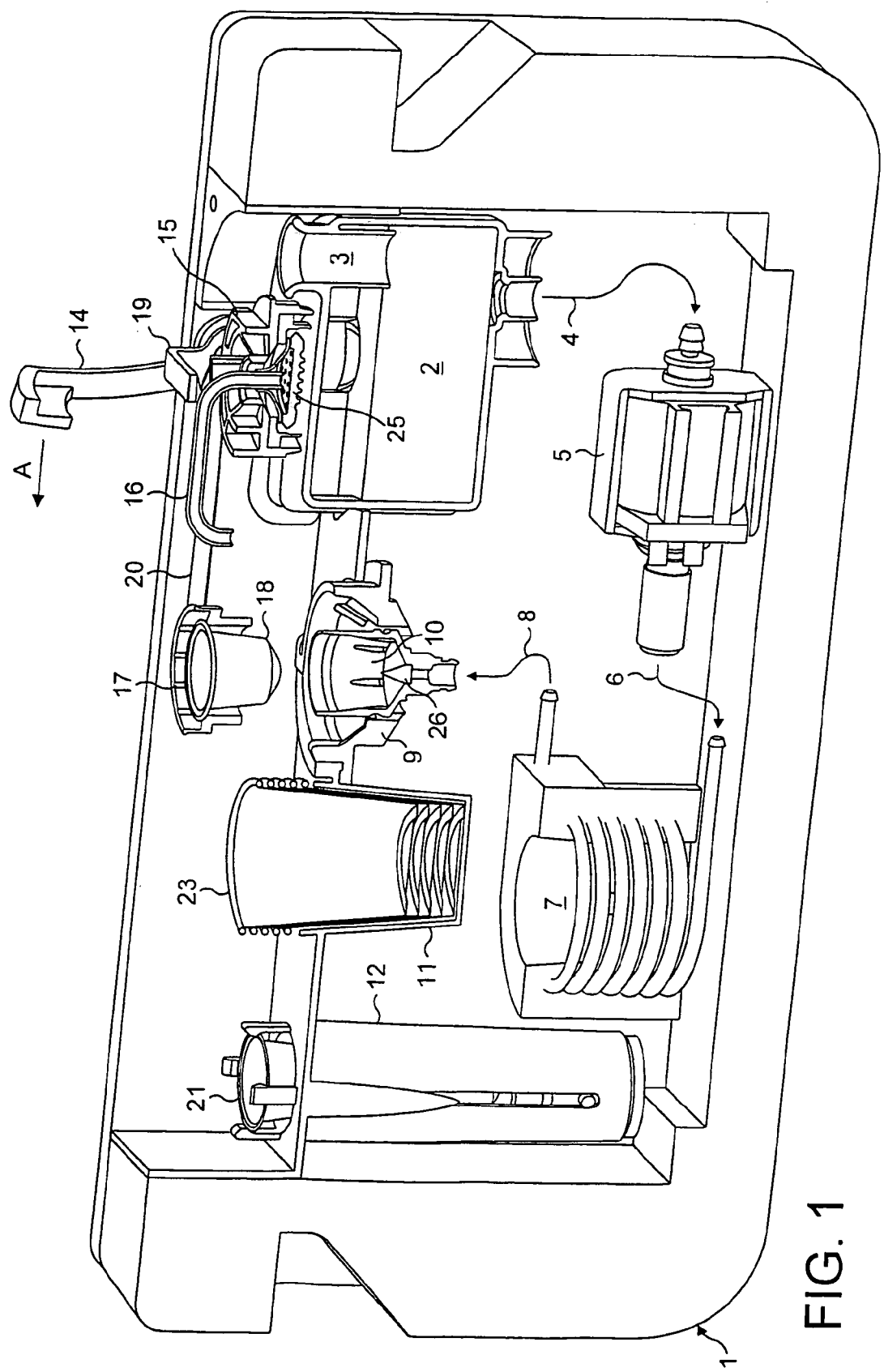
FIG. 1 is a schematic perspective section through the machine in the open position.

In accordance with the present invention, a "low-voltage vehicle" is intended to mean a car, boat or other cabin connected to a 12–50 volt battery. The present invention makes it possible to produce an espresso coffee with a heating element that is ready in about 4 minutes. As is obvious from the present disclosure, after the first heating of the heating element, that is, for subsequent coffees, the heating time is shorter. The important point about this machine is that the heating element does not operate, or only at reduced power, when the coffee is being brewed.

In this description, the expression "cartridge of coffee" means any type of cartridge, whether packaged in filter paper or nonwoven material, or a sealed cartridge that opens under the effect of pressure. In the latter case, the capsules used may for example be those forming the subject-matter of Patent EP 512 468 filed by the present applicant. In this case the brewing head must have a needle as mentioned in Patent EP 512 470 filed by the present applicant. In this case, moreover, the moveable closure of the head must have relief and sunken features, as described in the above patent.

The means of moving the closure is a sliding system, in which the closure is moved in two guides to a position where the closure is locked onto the brewing head, in such a way as to ensure that there are no leaks from the machine while the cartridge of coffee is brewing. The movement of the closure involves an initial horizontal translational movement, after which the closure is pressed down. In another embodiment, the closure means is a jaw system, in which the brewing head is stationary and the closure pivots down through an arc of a circle on the head: this form also requires a means of locking the closure onto the brewing head.

Another great advantage of the machine according to the invention is that it can be filled, operated and emptied with one hand. Obviously, if the machine is being used in a moving car, it must not be the driver of the vehicle who prepares the coffee, but the passenger.

The machine according to the invention also includes a storage part for unused cartridges and a storage part for used cartridges.

When the vehicle is moving and the coffee is prepared during this time, it is of course important not to spill the coffee. For this purpose, the machine includes a receptacle for holding stacked containers directly underneath the outlet of the coffee dispensing pipe. The containers used are advantageously plastic cups.

When the consumer wishes to remove from the coffee machine the cartridge that has just been brewed, the cartridge is of course very hot: a ring is provided for this purpose in the brewing head for manual ejection of used cartridges.

The coffee machine described above can also be envisaged in more general terms. The invention relates to an espresso coffee machine comprising a water tank connected to a pump for pumping the water to a heating element, which is itself connected to a brewing head in which a cartridge of coffee is brewed, a moveable closure with a means or mechanism for moving the closure from an open position to a closed position and vice versa, and a coffee dispensing pipe associated with the closure to provide an outlet for brewed coffee, in which machine the means or mechanism for closing the head is a sliding or jaw means or system, and the machine is connected to an electric power supply. The point made earlier about the closure means is also applicable to this machine.

The present invention also relates to an espresso coffee machine comprising a water tank connected to a pump for pumping the water to a heating element, which is itself connected to a brewing head in which a cartridge of coffee is brewed, a moveable closure with a mechanism or means for moving the closure from an open position to a closed position and vice versa, and a coffee dispensing pipe on the closure, in which machine the brewing head comprises a ring to allow manual ejection of used cartridges. Again, the machine is connected to an electric power supply.

The invention further relates to an espresso coffee machine comprising a water tank connected to a pump for pumping the water to a heating element, which is itself connected to a brewing head in which a cartridge of coffee is brewed, a moveable closure with a mechanism or means for moving the closure from an open position to a closed position and vice versa, a coffee dispensing pipe on the closure, and a receptacle for holding stacked containers directly beneath the outlet of the coffee dispensing pipe, with the machine being connected to an electric power supply.

The control of the heating element is achieved by a conventional thermostat or other energizing device. As these components are known to skilled artisans, there is no need to provide further details of them herein.

The present invention also relates to a method for preparing an espresso coffee of uniform quality in a low-voltage vehicle, in which the following steps are followed using a device for preparing an espresso coffee:
a heating element is heated,
the heating of the element is switched off or reduced,
the water is pumped through the element,
a cartridge of coffee is brewed with the heated water from the element, and
the brewed coffee is collected in a container.

In this description, the expression "espresso coffee of uniform quality" means coffee that has not been overheated, is of a constant high quality, cup after cup, and also an ordinary coffee in a single brew. The heating element normally has a power of 200 to 1000 watts and it is connected as already mentioned above to a 12–50 volt battery.

In another form of the method, a device for preparing an espresso coffee by pumping hot water through the device at a controlled temperature and pressure is used. In this embodiment, the user can always be sure that the temperature and pressure of the water in the device remain constant and also contribute to the uniform quality of the coffee produced.

Lastly, the invention relates to a method for preparing an espresso coffee of uniform quality in a low-voltage vehicle using a device for preparing an espresso coffee, in which method the coffee is delivered through the device into a container in a secure manner. This is achieved by connecting the water tank, pump, heating element, brewing head and closure in series. In operation, the water is heated prior to being introduced into the brewing head, so that further operation of the heating element is not necessary when the heated water is being pumped to the brewing head.

Figure 3:
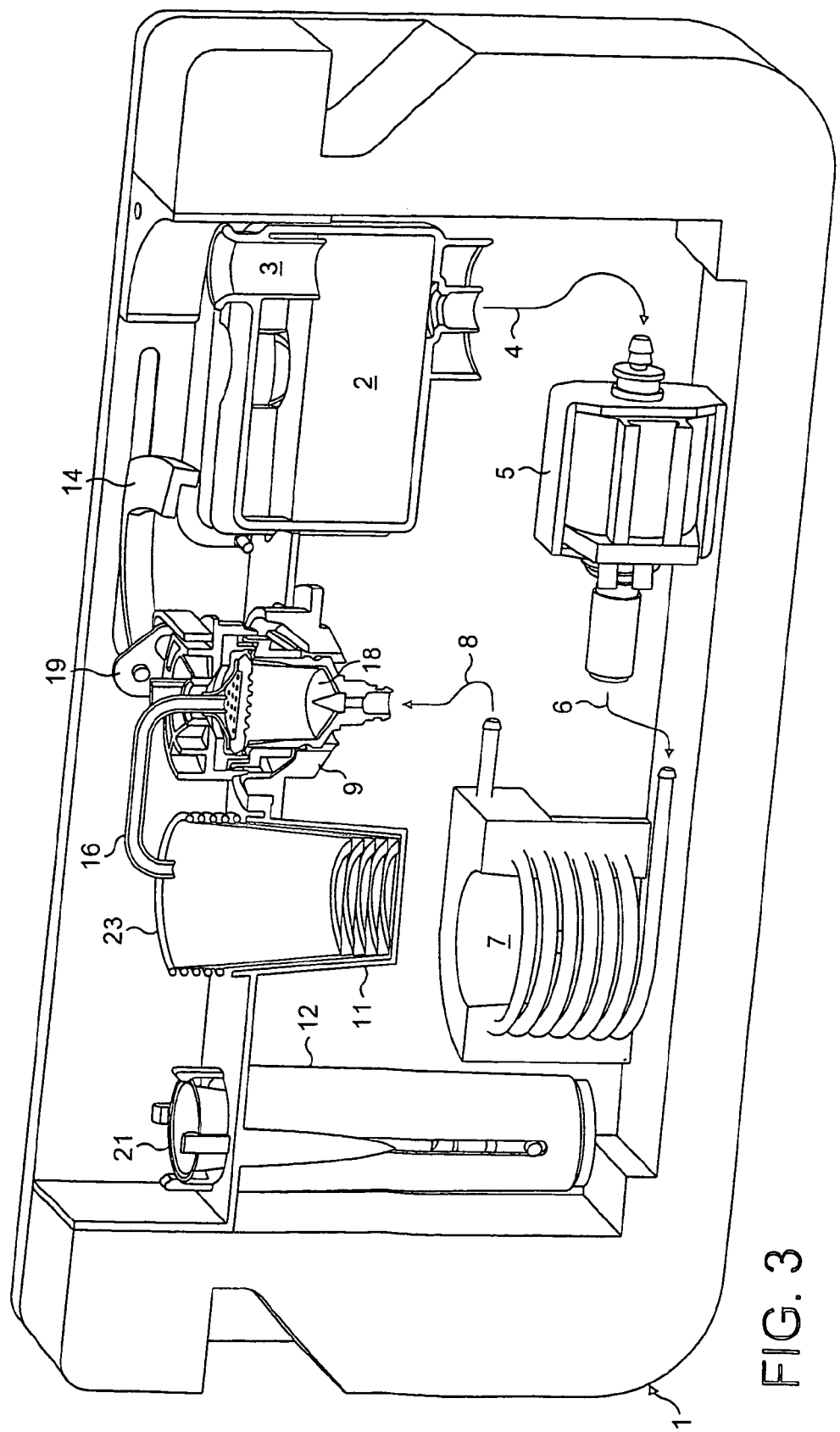
FIG. 3 is a schematic perspective section through the machine in the closed position.

The machine according to the invention comprises a frame (1) which contains the whole of the mechanism of the machine. The mechanism comprises a water tank (2) which can be filled through the opening (2). The pipe (4) at the bottom of the tank leads to the pump (5) and the pipe (6) runs from the outlet of the pump to the heating element (7). The pipe (8) leads from the outlet of the heating element to the brewing head (9), which contains a housing (10) for the capsule (18) whose contents are to be brewed. The capsules of the type known for use in a NESPRESSO® machine are suitable for use here. In the housing (10) is a ring (17) for removing the used cartridge. The moveable closure (15) is operated by a lever (14) and includes a coffee dispensing pipe (16). The closure is guided in a track (20) to the closed position. A receptacle (11) is positioned directly beneath the coffee dispensing pipe (16) when the machine is in the closed position, as shown in FIG. 3: this receptacle contains a stack of cups (23). The machine is powered for example by a car battery via a conventional electrical connection which is not shown.

Figure 4:
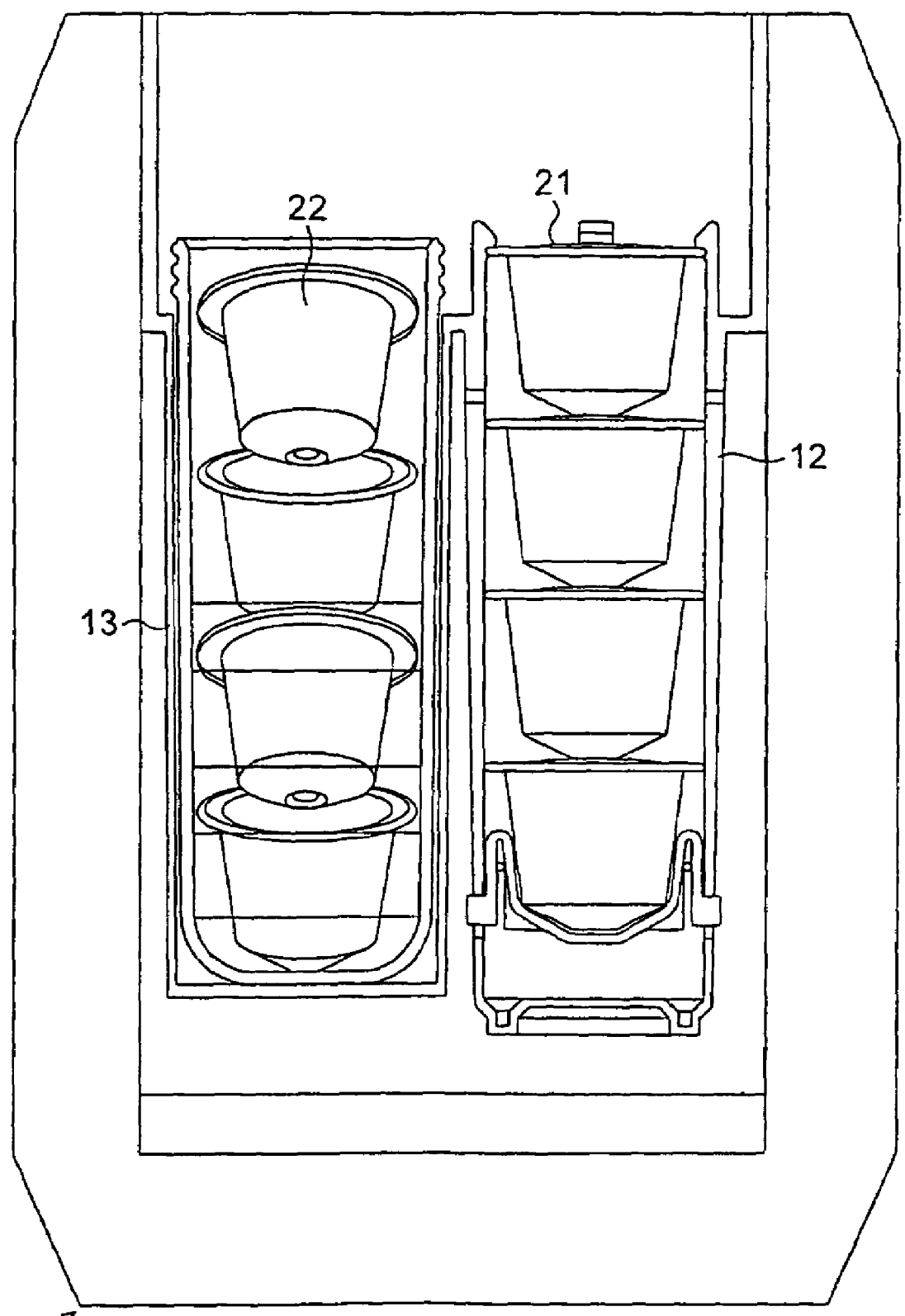
FIG. 4 is a schematic section through the storage part.

Lastly, the machine comprises a storage part (12) for unused cartridges (21) and a storage part (13) for used cartridges (22), as shown in FIG. 4.

The machine according to the invention operates as follows: beginning in the position shown in FIG. 1, the ring (17) is placed in the housing (10) of the brewing head (9) and an unused capsule (18) is placed in it. The consumer moves the lever (14) in the direction of the arrow A until the closure (15) is over the brewing head (9): this is the position in FIG. 2, the closure being guided in translational movement along the track (20). The consumer then pushes on the lever (14) to lower the moveable part (5) and then operates this lever (14) in the direction of the arrow B, so as to lock the brewing head (9) and the closure (15) together in a sealed manner by means of the locking system (19), and more particularly by its mechanical catches (30). When the heating element (7) has reached the required temperature, it stops heating and the pump (5) pumps the water from the tank (2) to the brewing head (9). The needle (26) pierced the bottom of the capsule when it was inserted and the top of the capsule will be pressed against the sunken and relief features (25): when sufficient pressure is reached inside the capsule, the top face of the capsule opens against the sunken and relief features and the coffee escapes through the coffee dispensing pipe (16) into the cup (23). Once the required amount has been dispensed, for example 60 ml, the pump is stopped and the coffee is ready. The coffee is held securely by the receptacle (11) even if the car is moving.

Preferably, the heating element can contain a volume of water that is at least equal to the amount needed for a single cup of espresso. In this way, the necessary amount of water for preparing the espresso is retained in the element where it can be heated to a uniform temperature prior to contacting the contents of the cartridge for brewing the beverage.

Furthermore, once the water temperature has been increased to the final value, the heating element can be de-energized since further heating of the water is not needed. In the situation where multiple servings are to be dispensed, the heating element can simply be energized to a lower value so that the time for reaching the desired heating temperature between dispensed cups can be decreased.

Figure 2:
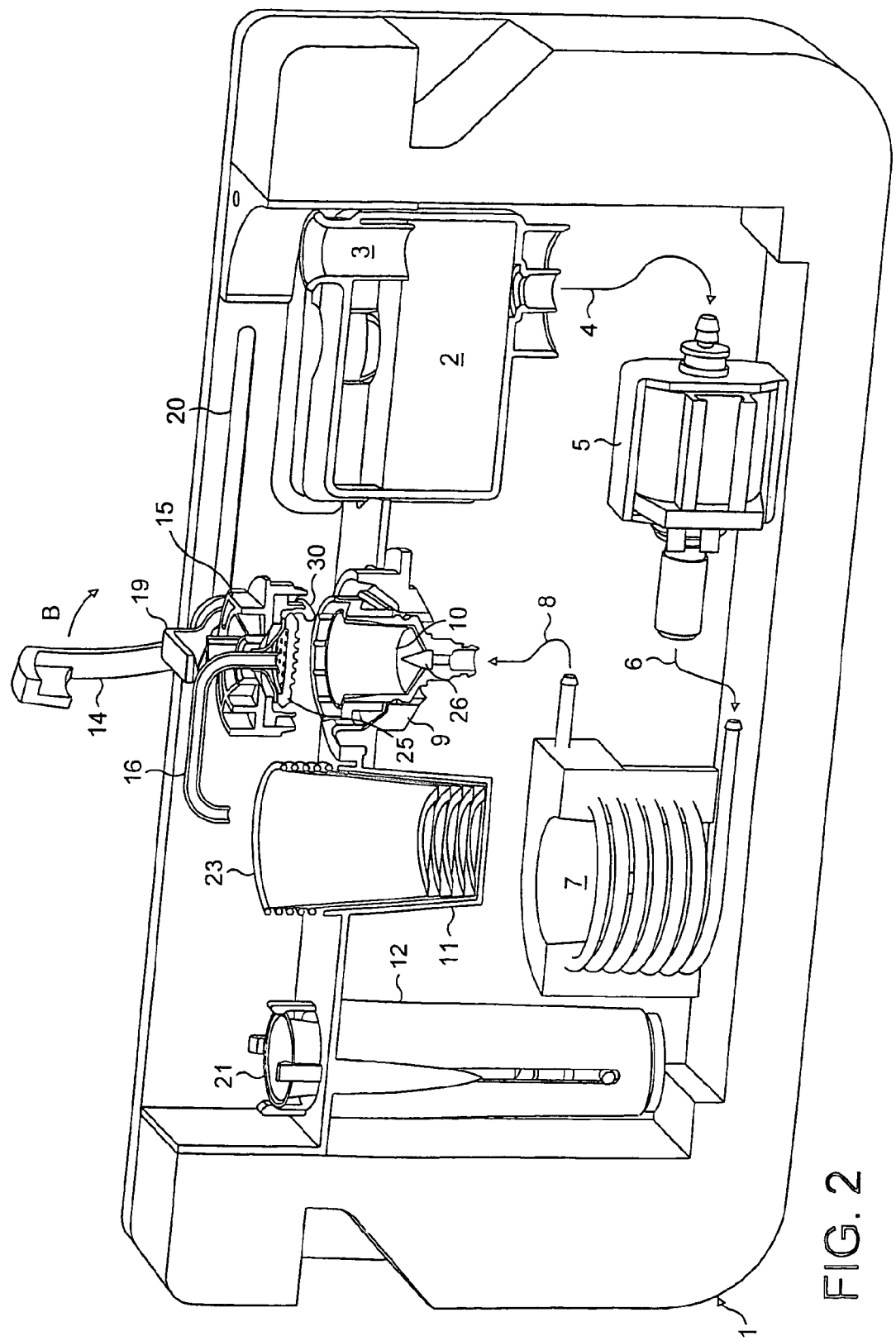
FIG. 2 is a schematic perspective section through the machine during the closing process.

The machine is then simply unlocked by operating the lever (14) and the closure (15) is returned to the position shown in FIG. 1. The consumer removes the ring (17) and places the used capsule in the storage part (13), replaces the ring (17) and places a new capsule from the storage part (12) in the brewing head (9), if the other occupant of the vehicle also wants coffee. As previously noted, the closure can automatically eject the used cartridge into the storage part using mechanisms that are the same as are conventionally used on NESPRESSO® machines.

What is claimed is:

1. An espresso coffee machine for a low-voltage vehicle, the machine comprising a water tank, a pump, a heating element, a brewing head wherein the water tank is fluidly connected to a pump for pumping water from the tank to a heating element positioned after said pump, the heating element which is itself fluidly connected to a brewing head in which a cartridge of coffee is brewed under pressure, a moveable closure for closing the head comprising a mechanism for moving the closure from an open position to a closed position and vice versa and a coffee dispensing pipe associated with the closure to provide an outlet for brewed coffee, a connection for engaging a low voltage electric power supply, and a controller that switches off or reduces power of the heating element when the pump is running, reduces power in that the heating element operates only on demand when a beverage is to be dispensed and stops heating when the required temperature is reached.

2. The coffee machine according to claim 1, wherein the mechanism for moving the closure is a sliding system.

3. The coffee machine according to claim 1, wherein the mechanism for moving the closure is a jaw system.

4. The coffee machine according to claim 1, wherein the heating element is configured and dimensioned to retain an amount of water therein which is sufficient to dispense a single espresso beverage, and the machine is configured and dimensioned to be filled, operated and emptied by one hand.

5. The coffee machine according to claim 1, further comprising a storage part for unused cartridges and a storage part for used cartridges.

6. The coffee machine according to claim 1, further comprising a receptacle for holding stacked containers directly beneath the outlet for the brewed coffee.

7. The espresso coffee machine of claim 1, in which machine the brewing head comprises a ring to allow manual ejection of used cartridges.

8. The coffee machine according to claim 7, further comprising a controller is provided for switching off or reducing the heating of the heating element, and wherein the heating element is configured and dimensioned to retain an amount of water therein which is sufficient to dispense a single espresso beverage, and the machine is configured and dimensioned to be filled, operated and emptied by one hand.

9. The coffee machine according to claim 7, further comprising a storage part for unused cartridges and a storage part for used cartridges.

10. The coffee machine according to claim 7, further comprising a receptacle for holding stacked containers directly beneath the outlet for the brewed coffee.

11. An espresso coffee machine comprising a water tank connected to a pump for pumping the water from the tank to a heating element positioned after said pump, the heating element which is itself connected to a brewing head in which a cartridge of coffee is brewed, a moveable closure with a mechanism for moving the closure from an open position to a closed position and vice versa, a coffee dispensing pipe associated with the closure, and a storage part for unused cartridges and a storage part for used cartridges, in which machine the mechanism for closing the head is a sliding or jaw system, and the machine being connected to a low voltage electric power supply, wherein the heating of the heating element is switched off or works at reduced power when the pump is running and wherein a controller is provided for operating the heating element on demand when a beverage is to be dispensed and stops heating when the required temperature is reached and for switching off or reducing the heating of the heating element, and the heating element is configured and dimensioned to retain an amount of water therein which is sufficient to dispense a single espresso beverage.

12. An espresso coffee machine comprising a water tank connected to a pump for pumping the water from the tank to a heating element positioned after said pump, the heating element which is itself connected to a brewing head in which a cartridge of coffee is brewed, a moveable closure with a mechanism for moving the closure from an open position to a closed position and vice versa, a coffee dispensing pipe associated with the closure, and a receptacle for holding stacked containers directly beneath an outlet for the brewed coffee, in which machine the mechanism for closing the head is a sliding or jaw system, and the machine being connected to a low voltage electric power supply, wherein the heating of the heating element is switched off or works at reduced power when the pump is running and wherein a controller is provided for operating the heating element on demand when a beverage is to be dispensed and stops heating when the required temperature is reached and for switching off or reducing the heating of the heating element, and the heating element is configured and dimensioned to retain an amount of water therein which is sufficient to dispense a single espresso beverage.

13. An espresso coffee machine comprising a water tank connected to a pump for pumping the water to a heating element, which is itself connected to a brewing head in which a cartridge of coffee is brewed under pressure, a moveable closure with a mechanism for moving the closure from an open position to a closed position and vice versa, a coffee dispensing pipe on the closure, in which machine the brewing head comprises a ring to allow manual ejection of used cartridges, the machine being connected to an electric power supply, and a storage part for unused cartridges and a storage part for used cartridges, and a controller that switches off or reduces power of the heating element when the pump is running.

14. An espresso coffee machine comprising a water tank connected to a pump for pumping the water to a heating element, which is itself connected to a brewing head in which a cartridge of coffee is brewed under pressure, a moveable closure with a mechanism for moving the closure from an open position to a closed position and vice versa, a coffee dispensing pipe on the closure, in which machine the brewing head comprises a ring to allow manual ejection of used cartridges, the machine being connected to an electric power supply, a receptacle for holding stacked containers directly beneath an outlet for the brewed coffee, and a controller that switches off or reduces power of the heating element when the pump is running.

* * * * *